United States Patent [19]

Akiyama et al.

[11] Patent Number: 4,827,444

[45] Date of Patent: May 2, 1989

[54] CARRY SKIP-AHEAD CIRCUIT FOR MANCHESTER-TYPE ADDER CHAIN

[75] Inventors: Satoshi Akiyama; Yuuichi Saito, both of Itami, Japan

[73] Assignee: Mitsubishi Denki Kabushiki Kaisha, Tokyo, Japan

[21] Appl. No.: 884,173

[22] Filed: Jul. 9, 1986

[30] Foreign Application Priority Data

Aug. 5, 1985 [JP] Japan ................... 60-172606

[51] Int. Cl.$^4$ ............................................. G05F 7/50
[52] U.S. Cl. ....................................................... 364/787
[58] Field of Search ................................. 364/784–788; 307/471–472

[56] References Cited

U.S. PATENT DOCUMENTS 3,728,532  4/1973  Pryor ..................... 364/787

FOREIGN PATENT DOCUMENTS 0143456  6/1985  European Pat. Off. ............ 364/784
0123634  10/1978  Japan ................................. 364/787

OTHER PUBLICATIONS

"New Scheme for VLSI Implementation of Fast ALV", IBM Technical Disclosure Bulletin, vol. 28, No. 3, Aug. 1985, pp. 1277–1282.
"Introduction to VLSI System", Carver Mead & Lynn Conway, pp. 22, 23, 150 & 151, Oct. 1980.

Primary Examiner—Gary V. Harkcom
Assistant Examiner—Long T. Nguyen
Attorney, Agent, or Firm—Lowe, Price, LeBlanc, Becker & Shur

[57] ABSTRACT

A bypass circuit (20) opens transmission gates (13) through (16) when the condition is satisfied that two bit values Ai and Bi (i=0, 1, ... n) to each full adder (1) are non-coincident with each other throughout the full adders. To this end, the inverse of the initial carry signal $C_0$ is outputted as the addition results $S_0$ and $S_n$ and the initial carry signal $C_0$ is outputted as the final stage output signal $C_n$.

4 Claims, 2 Drawing Sheets

CARRY SKIP-AHEAD CIRCUIT FOR MANCHESTER-TYPE ADDER CHAIN

BACKGROUND OF THE INVENTION

1. Field of the Invention

This invention relates to a logic circuit and particularly to a logic circuit having a Manchester-type carry chain.

2. Description of the Prior Art

FIG. 2 shows a conventional multistage adder having a Manchester-type carry chain. In the figure, each full adder 1 comprises input terminals 2 and 3, an addition result output terminal 4, a carry input terminal 5, and a carry output terminal 6.

In each of the full adders 1 constituting the multistage adder, when input signals enter the input terminals 2 and 3 and the carry input terminal 5, the results of the following operations appear at the addition result output terminal 4 and carry output terminal 6.

$$Si = Ai \oplus Bi \oplus Cin \quad (1)$$

$$Cout = Ai \cdot Bi \oplus Ai \cdot Cin \oplus Bi \cdot Cin \quad (2)$$

where $\oplus$ is a symbol for exclusive-OR operation. Herein, Ai, Bi (i=0, 1, ... n) are input signals to said full adders, Cin is a carry input signal, Cout is a carry output signal, and Si (i=0, 1, ... n) is an addition result output signal.

Now, a case will be considered in which the following addition is performed.

$$S = A \oplus B \oplus C_0$$

where $S = S_0 \sim S_n$, $A = A_0 \sim A_n$, and $B = B_0 \sim B_n$.

First, bit values Ai and Bi for input signals A and B are inputted to each full adder 1. An initial carry input signal $C_0$ is inputted from the carry input terminal 5 to the first stage full adder 1.

In the first stage full adder 1, the operations indicated by the equations (1) and (2) are performed and the addition result output signal $S_0$ and carry output signal Cout are outputted from the addition result output terminal 4 and carry output terminal 6, respectively. In the second stage full adder 1, logic operations are performed using input bit values $A_1$ and $B_1$ together with the carry output signal Cout from the first stage, and the addition result $S_1$ is outputted while the carry output signal Cout is fed to the subsequent stage. Similarly, the carry from the preceding stage is transferred to the subsequent stage for logic operation until the last stage is reached whereupon the operation is completed and the last stage carry output signal $C_n$ is outputted.

In addition, such a Manchester-type carry chain as is described above is disclosed on pp 22, 23, 150 and 151 of "INTRODUCTION TO VLSI SYSTEM," by Carver Mead and Lynn Conway.

Since the conventional full adder having the Manchester-type chain are constructed in the manner described above, logic operations on bits cannot be started in each stage until a carry is transferred from the preceding stage.

Therefore, the computing speed is limited by the carry transmission time; it becomes lower as the number of bits increases.

SUMMARY OF THE INVENTION

This invention has for its object the provision of a logic circuit having a greater computing speed.

In brief, this invention provides an arrangement wherein when bit inputs to each full adder satisfy predetermined conditions, the addition result and the carry output signal from the last stage full adder are produced and outputted on the basis of the initial carry input.

According to this invention, when bit inputs to each full adder satisfy predetermined conditions, the operation result is outputted without having to wait for the arrival of a carry signal; thus, the computing speed can be increased.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
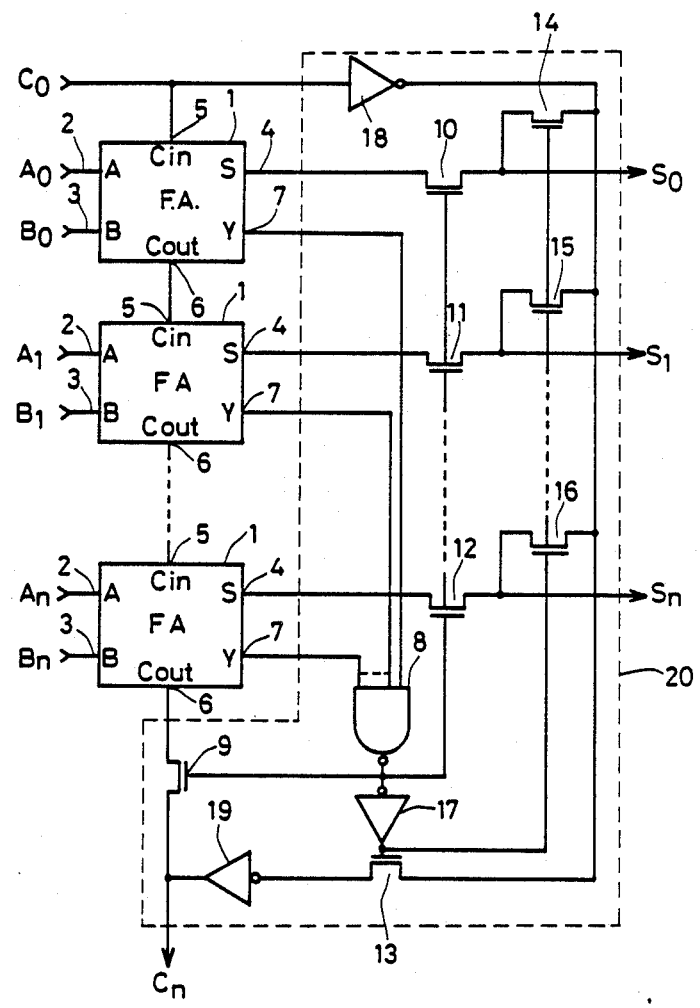
FIG. 1 is a view showing a logic circuit according to an embodiment of this invention.
Figure 2:
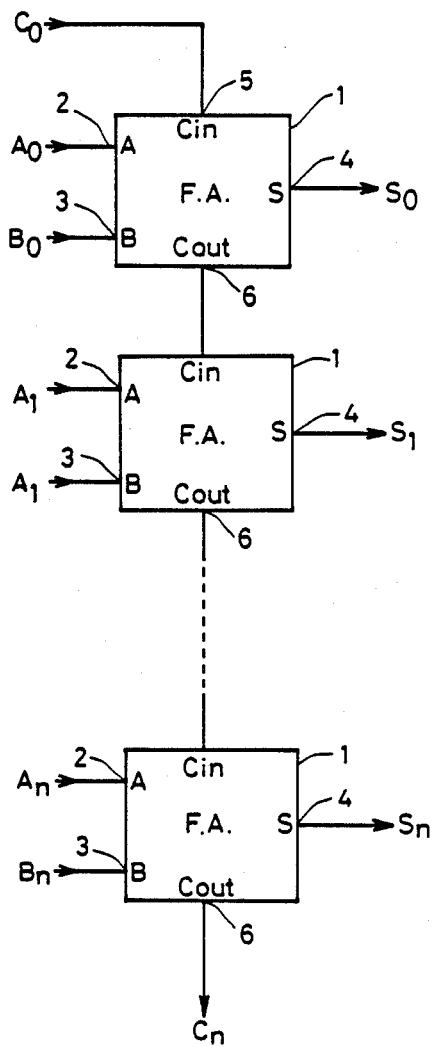
FIG. 2 is a view showing a conventional multistage adder having a Manchester-type carry chain.

FIG. 1 is a view showing a logic circuit according to an embodiment of the invention, wherein the same reference characters as those used in FIG. 2 indicate the same portions as in FIG. 2. In FIG. 1, each full adder 1 has an exclusive-OR operation result output terminal 7 for outputting th result of exclusive-OR operation on input bit values Ai and Bi (i=0, 1, ... n). Further, in this embodiment, the output sides of the full adders are provided with a bypass circuit 20. This bypass circuit 20 includes a NAND gate 8 which is an example of decision means, transmission gates 9 through 12 which are an example of first switch means, transmission gates 13 through 16 which are an example of second switch means, and inverters 17 through 19. The NAND gate 8 is fed with signals from the exclusive-OR operation result output terminals 7 of the full adders 1. The output from the NAND gate 8 is transferred to the gates of the transmission gates 9 through 12. The transmission gate 9 has one conductive terminal connected to the carry output terminal 6 of the last stage full adder 1 and the other conductive terminal connected to the output end for the carry signal from the last stage. The transmission gates 10 through 12 are provided for the respective full adders 1 and have one of their respective ends connected to the addition result output terminals 4 of the corresponding full adders 1 and the other ends thereof connected to the output terminals for addition result output signals $S_0$ through $S_n$. These transmission gates 9 through 12 are adapted to become conductive when the output from the NAND gate 8 is "1."

Further, the output from the NAND gate 8 is inverted by the inverter 17 and then imparted to the gate of each of the transmission gates 13 through 16. Therefore, these transmission gates 13 through 16 are rendered conductive when the output from the NAND gate 8 is "0." The transmission gates 13 through 16 are fed at one of their respective ends with the initial carry input signal $C_0$ inverted by the inverter 18. The other conductive terminal of the transmission gate 13 is connected to the output end for the last stage carry output signal $C_n$ through the inverter 19. The transmission gates 14 through 16 are provided for the respective full adders 1 and connected at the other conductive ends thereof to the output ends for the addition result output signals $S_0$ through $S_n$.

The logic circuit constructed in the manner described above utilizes the principle that when the relation $$Ai \oplus Bi = 1 (i=0 \sim n) \tag{3}$$

holds for all full adders 1, the last stage carry output signal $C_n$ and the addition result output signal $S_i$ ($i=0\sim n$) are expressed as a function of the initial carry input signal $C_0$, as follows:

$$C_n = C_0 \tag{4}$$

$$Si = \overline{C_0}(i=0\sim n) \tag{5}$$

The operation of the embodiment will now be described in more detail.

First, when input signals Ai and Bi are inputted to each full adder 1, the result of exclusive-OR operation on Ai and Bi is outputted from the exclusive-OR operation result output terminal 7 and fed to NAND gate 8.

In this case, if $(A_0, B_0)$ through $(A_n, B_n)$ are all either (1,0) or (0, 1), the NAND gate 8 outputs "0" to close the transmission gates 9 through 12 while opening the transmission gates 13 through 16. That is, the operation result $Si$ ($=\overline{C_0}$) and the last stage carry output signal $C_n$ ($=C_0$) satisfying the equations (4) and (5) are directly outputted through the bypass circuit 20. In addition, $\overline{C_0}$ is the inverse of the initial carry input signal $C_0$.

If $(A_0, B_0)$ through $(A_n, B_n)$ do not satisfy the aforesaid equation (3), the NAND gate 8 outputs "1" within the bypass circuit 20 to open the transmission gates 9 through 12 while closing the transmission gates 13 through 16; thus, the present adder operates in the same manner as a conventional adder having a Manchester-type carry chain.

In the above embodiment, for an adder handling (n+1) bits, a single bypass circuit 20 has been used to handle all bits; however, bits on which logic operations are to be performed may be divided and a bypass circuit may be provided for each division, whereby a computing speed can be further increased. This is because the chance of the conditions of the equation (3) being satisfied is increased.

As described above, in the embodiment shown in FIG. 1, a bypass circuit has been provided whereby in the case where all input signals to the full adders are non-coincident with each other, the initial carry input signal is directly outputted as the last stage carry output signal and the logic signal which is the inverse of the carry signal is outputted as the addition result output signal from each full adder. In this case, therefore, there is no need to wait for the arrival of a carry signal and hence the computing speed can be increased.

Although the present invention has been described and illustrated in detail, it is clearly understood that the same is by way of illustration and example only and scope of the present invention being limited only by the terms of the appended claims.

What is claimed is:

1. A logic circuit including a plurality of interconnected stages of full adders, wherein a first stage full adder of said plurality of full adders includes an input for receiving an initial carry signal input and each full adder in each subsequent stage includes a carry input for receiving a carry output signal from a full adder in a preceding stage as a carry input signal, each full adder further including inputs for two single-bit signals to be added thereby, whereby a Manchester-type carry chain is formed, said logic circuit comprising:

decision means for determining whether or not said two single-bit signals input to each full adder are non-coincident with each other for each of the full adders and thereby determining that a bypass condition is satisfied, bypass circuit means responsive to a determination by said decision means that said condition is not satisfied by outputting an addition result output signal from each full adder and a carry output signal from a last stage full adder, said bypass circuit means being further responsive to a determination by said decision means that said bypass condition is satisfied for inverting said initial carry signal to generate an inverted initial carry signal and outputting said inverted initial carry signal as said addition result output signal corresponding to each full adder and outputting said initial carry signal as said carry output signal from said last stage full adder.

2. A logic circuit as set forth in claim 1, wherein said bypass circuit means comprises:

a plurality of first switch means for receiving addition result output signals from respective ones of said full adders and said plurality of first switch means being arranged to turn on in response to a determination by said decision means that said bypass condition is not satisfied, thereby directly outputting an addition result output signal from each full adder, a plurality of second switch means connected to receive one of the initial carry signal and the inverted initial carry signal and to output a signal representing an addition result output from each said full adder and the carry output from the last stage full adder, said plurality of second switch means arranged to turn on in response to a determination by said decision means that said bypass condition is satisfied, thereby outputting as said addition result output signal corresponding to each full adder said inverted initial carry signal, and an inverter means for inverting the inverted initial carry signal transmitted by a particular one of said second switch means connected to the carry output signal from said last full adder, thereby outputting said initial carry signal as said carry output signal from said last full adder.

3. A logic circuit as set forth in claim 1, wherein said Manchester-type carry chain is divided into a number of groups of full adders, said logic circuit further comprising an equal number of said bypass circuit means, each being coupled to one of said groups of full adders.

4. A skip-ahead carry adder comprising:

a plurality of full adders including first and last full adders, each of said full adders including a carry-in input, first and second addend bit inputs and a carry-out output, a sum output, and an exclusive-OR output, said first full adder receiving an externally supplied carry-in signal at a carry-in input thereof and each of all others of said plurality of full adders receiving a carry-in signal from a carry-out output of a previous one of said full adders whereby said full adders are arranged to form a Manchester-type carry chain, and logic circuit means for outputting a last carry-out signal corresponding to said carry-out output of said last adder, and for outputting signal corresponding to each sum signal bit from each of said plurality of full adders, said logic circuit means including:

(a) combinational logic means for generating a bypass command signal in response to a coincidence of exclusive-OR output signals from all of said plurality of full adders, and (b) bypass circuit means for outputting said externally supplied carry-in signal as said last carry-out signal and replacing said sum signal bit output from each of said plurality of full adders by an inverse of said externally supplied carry-in signal in response to said bypass command signal, said bypass circuit supplying said carry-out output from said last full adder as said last carry-out signal and outputting a sum signal bit output from corresponding ones of said plurality of adders in response to an absence of said bypass command signal.

* * * * *